United States Patent [19]

Gregorovich et al.

[11] 4,164,488
[45] Aug. 14, 1979

[54] AQUEOUS THERMOSETTING ACRYLIC ENAMEL

[75] Inventors: Basil V. Gregorovich; James J. Sanderson, both of Wilmington, Del.

[73] Assignee: E. I. Du Pont de Nemours and Company, Wilmington, Del.

[21] Appl. No.: 866,649

[22] Filed: Jan. 3, 1978

Related U.S. Application Data

[63] Continuation of Ser. No. 641,374, Dec. 17, 1975, abandoned, which is a continuation of Ser. No. 456,142, Mar. 29, 1974, abandoned, which is a continuation-in-part of Ser. No. 307,004, Nov. 16, 1972, abandoned.

[51] Int. Cl.$^2$ ............................ C08L 61/28; C08L 33/12
[52] U.S. Cl. .................... 260/29.4 UA; 260/29.6 TA; 260/39 R; 260/42.52; 428/460; 428/463
[58] Field of Search ............... 260/29.4 UA, 29.6 TA, 260/851, 856

[56] References Cited

U.S. PATENT DOCUMENTS

| | | | |
|---|---|---|---|
| 3,107,227 | 10/1963 | Suen et al. | 260/29.4 UA |
| 3,245,932 | 4/1966 | Glavis et al. | 260/29.4 UA |
| 3,637,546 | 1/1972 | Parker | 260/15 |
| 3,661,827 | 5/1972 | Taft | 260/29.6 MN |
| 3,669,942 | 6/1972 | Van Westrenen et al. | 260/29.4 UA X |
| 3,784,501 | 1/1974 | Pettit | 260/851 X |
| 3,790,513 | 2/1974 | Victorius | 260/856 X |

FOREIGN PATENT DOCUMENTS

1087623 10/1967 United Kingdom .

*Primary Examiner*—Walter C. Danison

[57] ABSTRACT

The aqueous thermosetting acrylic coating composition contains the following film-forming constituents:
(1) an acrylic polymer of styrene and/or methyl methacrylate, an alkyl acrylate or an alkyl methacrylate other than methyl methacrylate, a hydroxy alkyl acrylate or a hydroxy alkyl methacrylate and an $\alpha,\beta$-unsaturated carboxylic acid wherein the polymer has an acid number of 35–150 and a carboxyl/hydroxyl ratio of 1:0.2 to 1:3; and
(2) a water soluble or water dispersible alkylated melamine formaldehyde resin;
the novel coating composition is useful as an exterior finish for automobile and truck bodies.

8 Claims, No Drawings

AQUEOUS THERMOSETTING ACRYLIC ENAMEL

CROSS REFERENCE TO RELATED CASES

This application is a continuation of Ser. No. 641,374 filed Dec. 17, 1975, now abandoned, which is a continuation of Ser. No. 456,142, filed Mar. 29, 1974, now abandoned, which is a Continuation-in-Part of Ser. No. 307,004, filed Nov. 16, 1972, now abandoned.

BACKGROUND OF THE INVENTION

This invention relates to an aqueous based coating composition and in particular to an aqueous thermosetting acrylic enamel that provides a high quality finish for the exterior of automobile and truck bodies.

Thermosetting acrylic enamels are well known in the art as shown by Frazier et al. U.S. Pat. No. 2,681,897, issued June 22, 1954; Vasta U.S. Pat. No. 3,338,860, issued Aug. 29, 1967; Fisk et al. U.S. Pat. No. 3,365,414, issued Jan. 23, 1968; Vasta U.S. Pat. No. 3,622,651, issued Nov. 23, 1971; and Parker U.S. Pat. No. 3,637,546, issued Jan. 25, 1972. These acrylic enamels are all solvent based systems and do not provide a non-air-polluting finish. Taft U.S. Pat. No. 3,661,827, issued May 9, 1972 is directed to a process for preparing a water dispersible acrylic enamel composition but this product does not meet the needs of the automobile and truck manufacturing industry for a high quality water based finish.

The novel aqueous thermosetting acrylic enamel coating composition of this invention utilizes a particular acrylic polymer having a uniform composition and having a balance or hydroxyl and carboxyl groups in combination with a water dispersible or water soluble cross-linking agent such as an alkylated melamine formaldehyde resin to form a high quality finish useful for the exterior of automobile and truck bodies.

SUMMARY OF THE INVENTION

The aqueous thermosetting acrylic enamel coating composition comprises 10–60% by weight of film-forming constituents and correspondingly 90–40% by weight of water and up to 20% by weight of a solvent for the film-forming constituents; wherein the film-forming constituents consist essentially of (1) 60–90% by weight, based on the weight of the film-forming constituents, of an acrylic polymer having a uniformity factor of at least 75% which consists essentially of (a) 20–60% by weight, based on the weight of the acrylic polymer, of a hard constituent which is either methyl methacrylate, or a blend of methyl methacrylate and styrene wherein the styrene comprises up to 40% by weight of the acrylic polymer;

(b) 20–40% by weight, based on the weight of the acrylic polymer, of a soft acrylic constituent that is either an alkyl acrylate having 2–12 carbon atoms in the alkyl group, an alkyl methacrylate having 4–12 carbon atoms in the alkyl group, or a mixture of the above alkyl acrylate and alkyl methacrylate;

(c) 4–20% by weight, based on the weight of the acrylic polymer, of a hydroxy-containing constituent which is either a hydroxyalkyl methacrylate or a hydroxyalkyl acrylate or a mixture thereof in which the alkyl groups have 2–4 carbon atoms, (d) 4–20% by weight, based on the weight of the acrylic polymer, of α,β-unsaturated carboxylic acid;

wherein the polymer has a carboxyl to hydroxyl ratio of 1:0.2 to 1:1.8 and an acid number of about 35–150 and a weight average molecular weight of 5,000–80,000; and (2) 10–40% by weight, based on the weight of the film-forming constituents, of a water dispersible or water soluble cross-linking resin, preferably, an alkylated melamine formaldehyde resin having 1–4 carbon atoms in the alkyl group; and the composition is at least partially neutralized with an amine and has a pH of about 6–9.

Another aspect of this invention is an aqueous thermosetting acrylic enamel coating composition comprising 10–60% by weight of film-forming constituents, and correspondingly, 90–40% by weight of water and up to 20% by weight of a solvent for the film-forming constituents; wherein the film-forming constituents consist essentially of (1) 60–90% by weight, based on the weight of the film-forming polymer, of an acrylic polymer having a uniformity factor of at least 75%, which consists essentially of (a) 55–76% by weight, based on the weight of the acrylic polymer, of methyl methacrylate;

(b) 18–38% by weight, based on the weight of the acrylic polymer, of an alkyl acrylate having 2–12 carbon atoms in the alkyl group, an alkyl methacrylate having 4–12 carbon atoms in the alkyl group or a mixture of the above alkyl acrylate and alkyl methacrylate;

(c) 4–15% by weight, based on the weight of the acrylic polymer, of a hydroxy alkyl acrylate, a hydroxy alkyl methacrylate or a mixture thereof in which the alkyl groups have 2–4 carbon atoms;

(d) 2–12% by weight, based on the weight of the acrylic polymer, of an α,β-unsaturated carboxylic acid;

wherein the polymer has a carboxyl to hydroxyl ratio of 1:0.2 to 1:4 and an acid number of 35–150, a weight average molecular weight of about 10,000 to 50,000; and a glass transition temperature of about 20° to 50° C.; and (2) 10–40% by weight, based on the weight of the film-forming constituents, of a water-dispersible cross-linking resin such as a partially or fully alkylated melamine formaldehyde resin having 1–4 carbon atoms in the alkyl groups;

the composition is at least partially neutralized with an amine and the composition has a pH of about 6–9.

DESCRIPTION OF THE INVENTION

The novel coating composition of this invention has a solids content of film-forming constituents of about 10–60% by weight and preferably about 20–50% by weight. The novel composition is usually pigmented and contains about 0.1–40% by weight of pigment and preferably, 0.1–30% by weight pigment.

The film-forming constituents of the novel coating composition comprise 60–90% by weight of acrylic polymer and correspondingly, 40–10% by weight of a water dispersible or water soluble cross-linking resin, preferably an alkylated melamine formaldehyde resin which is compatible with the acrylic polymer is used. Preferably, the novel composition contains 65–85% of the acrylic resin and 35–15% by weight of an alkylated melamine formaldehyde resin and more preferably about 70% by weight of the acrylic polymer is used in combination with about 30% by weight of an alkylated melamine formaldehyde resin.

The acrylic polymer used in the novel coating composition of this invention is partially soluble and partially dispersed in the aqueous medium. About 30–50% by weight of the acrylic polymer is dispersed and has a particle size of about 0.01–0.10 microns preferably about 0.02–0.06 microns and the residual 50–70% by weight of the acrylic polymer is soluble and dissolved in the aqueous medium. To obtain water solubility and dispersibility the acrylic polymer has a carboxyl to hydroxyl ratio of 1:0.2 to 1:1.8 which is the molar ratio of carboxyl groups to hydroxyl groups of the polymer. Acrylic polymers having a hydroxyl to carboxyl ratio of 1:0.2 to 1:4 are also useful.

The acrylic polymer used in the novel coating composition of this invention has a uniformity factor of at least 75% and preferably 80–95%. The uniformity factor is the percent of the polymer in which the constituents are within plus or minus 15% of the average amount given for the polymer. For example, if the average composition of the acrylic polymer is 54% methyl methacrylate, 34% butyl acrylate, 6% 2-hydroxyethyl acrylate and 6% acrylic acid; 75% of the polymer will be within plus or minus 15% of these average values or 54±8% methyl methacrylate, 34±5% butyl acrylate, 6±0.9% 2-hydroxyethyl acrylate, and 6±0.9% acrylic acid.

The acrylic polymer utilized in the novel composition of this invention is prepared by a programmed addition of the monomers, polymerization catalysts and solvents. This programmed addition process is an attempt to form polymer at all stages of the polymerization process which is essentially the same as the predetermined composition, and results in a polymer composition upon completion of the process which has a uniformity factor of at least 75%. This process allows for high percentage conversion of monomers to polymer and also provides a polymer having a relatively uniform molecular weight. These polymers when used in the novel composition of this invention provide high quality finishes.

Conventional polymerization processes, such as batch polymerization, commonly used in the art provide polymers with a wide range of compositions and molecular weights which are not suitable for the novel coating composition of this invention.

The above programmed addition polymerization process is based on a computer program which uses known polymerization equations and activity ratios of monomers to determine the monomer addition rates and ratios and polymer polymerization temperatures and times. This forms a polymer that has a uniform composition throughout. The above programmed addition procedure can be based on a computer program which uses a polymerization equation in which the polymerization values of the monomers are used. In general, the programmed polymerization procedure comprises an initial charge of monomers and solvents which are heated to the reflux temperature in the polymerization vessel, then at given intervals monomers and polymerization initiator are charged into the vessel while maintaining a reflux temperature according to the programmed polymerization procedure. Throughout the polymerization reaction, the polymer being formed has a uniformity factor of at least 75%. In general, the polymerization is conducted at about 75°–125° C. over a 2–4 hour period to form a polymer that has a weight average molecular weight of about 5,000–80,000, and preferably, about 10,000–50,000, and more preferably, 35,000–45,000, determined by gel permeation chromatography. The polymer has an acid number of about 35–150, preferably about 35–80.

In one preferred process which prepares a polymer of 52–56% by weight methyl methacrylate, 32–36% by weight butyl acrylate, 5–7% by weight of hydroxyethyl acrylate and 5–7% by weight of acrylic acid, the constituents are reacted as follows:

Step (1)

The following constituents are charged into a reaction vessel and are heated to reflux temperature:
13–15% by weight of the total amount of methyl methacrylate,
52–54% by weight of the total amount of butyl acrylate,
28–30% by weight of the total amount of hydroxy ethyl acrylate,
23–25% by weight of the total amount of acrylic acid,
solvents such as isopropanol and ethylene glycol monobutyl ether and a chain transfer agent such as lauryl mercaptan.

Step (2)

The following ingredients are then charged into the reaction vessel:
polymerization catalyst such as benzoyl peroxide and optionally,
14–16% by weight of the total amount of methyl methacrylate,
the addition of the methyl methacrylate in this step is optional since this amount of methyl methacrylate may be added in the first step and a solvent may be used for the benzoyl peroxide.

Step (3)

The following ingredients are then slowly and continuously charged into the reaction vessel over a 14–16 minute period:
20–21% of the total amount of methyl methacrylate,
13–15% of the total amount of butyl acrylate,
31–33% of the total amount of hydroxy ethyl acrylate,
22–24% of the total amount of acrylic acid, and
polymerization initiator of benzoyl peroxide.

Step (4)

The following ingredients are then slowly and continuously charged into the reaction vessel over a 49–51 minute period while maintaining the reaction mixture at a reflux temperature,
31–33% of the total amount of methyl methacrylate,
20–22% of the total amount of butyl acrylate,
31–33% of the total amount of hydroxy ethyl acrylate,
33–35% of the total amount of acrylic acid, and
polymerization initiator of benzoyl peroxide.

Step (5)

The following ingredients are then slowly and continuously charged into the reaction vessel over a 75–80 minute period:
17–19% of the total amount of methyl methacrylate,
11–13% of the total amount of butyl acrylate,
6–8% of the total amount of hydroxyethyl acrylate
17–19% of the total amount of acrylic acid and polymerization initiator of benzoyl peroxide;
the reaction mixture is held at reflux temperature for about 25–35 minutes to form a polymer.

Step (6)

The polymer is then neutralized with an amine and then diluted with water to form a dispersion.

Typical solvents used in the polymerization process are isopropanol, n-propyl alcohol, diacetone alcohol and other alcohols, acetone, acetyl acetone, ethylene glycol monoethyl ether, ethylene glycol monobutyl ether and ethylene glycol monomethyl ether acetate. Solvents of limited water solubility can be used such as methyl ethyl ketone, ethylene glycol monoethyl ether acetate. The novel composition can contain up to about 20% by weight of a solvent but preferably contains 5–15% by weight of solvent. If desired the novel composition may be made solvent free.

About 0.1–4% by weight, based on the weight of the monomer used to prepare the acrylic polymer, of the polymerization catalyst is utilized. Typical catalysts are azo-bis-isobutyronitrile, azo-bis-(α, γ-dimethylvaleronitrile), benzoyl peroxide, t-butyl peroxypivalate, t-butyl peracetate and the like. Chain transfer agents such as lauryl mercaptan are also used.

The acrylic polymer contains 20–60% by weight of a hard constituent which can be methyl methacrylate or a mixture of methyl methacrylate and styrene; up to 40% by weight of the polymer can be styrene. The acrylic polymer can contain 5 to 30% by weight of styrene in combination with 15 to 30% by weight of methyl methacrylate. Preferably, the polymer contains about 52–57% by weight of methyl methacrylate.

The acrylic polymer contains 20–40% by weight of a soft acrylic constituent which is either an alkyl acrylate that has 2–12 carbon atoms in the alkyl group, an alkyl methacrylate having 4–12 carbon atoms in the alkyl group or a mixture of these two constituents. Preferably, the acrylic polymer contains 28 to 38% by weight of the soft acrylic constituent, preferably, an alkyl acrylate having 2–8 carbon atoms in the alkyl group. The following are typical soft acrylic monomers which can be utilized: ethyl acrylate, propyl acrylate, isopropyl acrylate, butyl acrylate, isobutyl, acrylate, hexyl acrylate, 2-ethylhexyl acrylate, octyl acrylate, nonyl acrylate, lauryl acrylate and the like, butyl methacrylate, isobutyl methacrylate, pentyl methacrylate, hexyl methacrylate, octyl methacrylate, 2-ethylhexyl methacrylate, decyl methacrylate, lauryl methacrylate and the like. Butyl acrylate is the preferred soft acrylic constituent since it forms a high quality polymer that has excellent physical properties.

Under some conditions, up to 60% of the soft acrylic constituent can be used to prepare the acrylic polymer, for example, butyl methacrylate can be used in this amount.

The acrylic polymer contains 4–20% by weight of a hydroxy containing constituent such as a hydroxy alkyl acrylate or a hydroxy alkyl methacrylate or a mixture of these two compounds. Preferably, the polymer contains about 5–10% of the hydroxyl containing constituent. These constituents contain 2–4 carbon atoms in the alkyl groups and are, for example, hydroxyethyl acrylate, hydroxybutyl acrylate, hydroxyethyl methacrylate, hydroxypropyl, methacrylate, and hydroxybutyl methacrylate.

The acrylic polymer also contains 4–20% by weight, based on the weight of the acrylic polymer, of an α,β-unsaturated carboxylic acid. Typically useful acids are acrylic acid, methacrylic acid, crotonic acid, itaconic acid, propyl acrylic acid, and the like. Preferably, acrylic acid and methacrylic acid and used in amounts of 4–10% by weight since these acids form high quality polymers useful in the novel composition of this invention.

One preferred acrylic polymer used in the novel coating composition of this invention contains 50–60% by weight of methyl methacrylate, 30–40% by weight of a soft acrylic constituent, preferably butyl acrylate, 5–10% by weight of the hydroxy containing constituent, preferably hydroxyethyl acrylate or hydroxypropyl methacrylate, and 4–12% by weight of acrylic acid, methacrylic acid, or itaconic acid. These preferred acrylic polymers have a weight average molecular weight of about 20,000–50,000, an acid number of about 35–100 and a carboxyl to hydroxyl ratio of about 1:1.03 to 1:1.5.

Another particularly useful acrylic polymer which gives a high quality finish contains about 28–32% by weight of styrene, 22–26% by weight of methyl methacrylate, 30–35% by weight of butyl acrylate, 7–9% by weight of hydroxy ethyl acrylate and 4–6% by weight of acrylic acid and has an acid number of about 30 to 50, a carboxyl to hydroxyl ratio of 1:0.4 to 1:1.5 and a weight average molecular weight of about 20,000–50,000.

Another useful polymer contains 55–76% by weight of methyl methacrylate or a mixture of methyl methacrylate and styrene; up to 40% by weight of the polymer can be styrene. Preferably, this polymer contains about 60–70% by weight of methyl methacrylate. This acrylic polymer contains 18–38% by weight of the aforementioned soft acrylic constituent which is either an alkyl acrylate that has 2–12 carbon atoms in the alkyl group, an alkyl methacrylate having 4–12 carbon atoms in the alkyl group or a mixture of these two constituents. Preferably, the acrylic polymer contains 14 to 32% by weight of the soft acrylic constituent, preferably, an alkyl acrylate having 2–8 carbon atoms in the alkyl group, such as butyl acrylate.

This other useful acrylic polymer contains 4–15% by weight of a hydroxy containing constituent such as the above hydroxy alkyl acrylate or a hydroxy alkyl methacrylate or a mixture of these two compounds. Preferably, the polymer contains about 4–8% of the hydroxyl containing constituent such as hydroxyethyl methacrylate or hydroxypropyl methacrylate. This acrylic polymer also contains 2–12% by weight, based on the weight of the acrylic polymer, of one of the above α,β-unsaturated carboxylic acids. Preferably, acrylic acid and methacrylic acid are used in amounts of 4–8% by weight.

This acrylic acrylic polymer has a weight average molecular weight of about 10,000 to 50,000 and a glass transition temperature of 20° to 50° C. and has a hydroxyl to carboxyl ratio of about 1:02–1:4.

One preferred acrylic polymer of this type used in the novel coating composition of this invention contains 60–70% by weight of methyl methacrylate, 14–32% by weight of a soft acrylic constituent, preferably butyl acrylate, 4–8% by weight of the hydroxy containing constituent, preferably hydroxyethyl acrylate or hydroxypropyl methacrylate, and 4–8% by weight of acrylic acid, methacrylic acid, or itaconic acid. These preferred acrylic polymers have a weight average molecular weight of about 35,000–50,000, an acid number of about 35–100 and a carboxyl to hydroxyl ratio of about 1:1.03 to 1:3.

One particularly useful acrylic polymer of this type which gives a high quality finish contains about 62–66% by weight of methyl methacrylate, 22–26% by weight of butyl acrylate, 5–7% by weight of hydroxy ethyl acrylate and 5–7% by weight of acrylic acid. In one preferred process for preparing this polymer, the constituents are reacted as follows:

Step (1)

The following constituents are charged into a reaction vessel and are heated to reflux temperature:
16–20% by weight of the total amount of methyl methacrylate,
55–59% by weight of the total amount of butyl acrylate,
28–30% by weight of the total amount of hydroxy ethyl acrylate,
23–25% by weight of the total amount of acrylic acid, and
solvnents such as 2-ethylhexanol and ethylene glycol monobutyl ether.

The following ingredients are then added: a chain transfer agent such as 2-mercapto ethanol and a solvent such as 2-ethylhexanol.

Step (2)

The following ingredients are then charged into the reaction vessel:
polymerization catalyst such as benzoyl peroxide, and
11–15% by weight of the total amount of methyl methacrylate.

Step (3)

About 40% of the following mixture of ingredients is then slowly and continuously charged into the reaction vessel over a 14–16 period and then the remaining 60% of the mixture is added while maintaining the reaction mixture at its reflux temperature.
50–54% of the total amount of methyl methacrylate,
30–34% of the total amount of butyl acrylate,
53–55% of the total amount of hydroxy ethyl acrylate,
56–58% of the total amount of acrylic acid, and the polymerization initiator of benzoyl peroxide and then additional solvent and chain transfer agent of mercaptoethanol and the reaction mixture is held at its reflux temperature for an additional 25–35 minutes.

Step (4)

The following ingredients are then slowly and continuously charged into the reaction vessel over a 75–85 minute period while maintaining the reaction mixture at a reflux temperature,
15–19% of the total amount of methyl methacrylate,
9–13% of the total amount of butyl acrylate,
16–18% of the total amount of hydroxy ethyl acrylate,
18–20% of the total amount of acrylic acid, and
polymerization initiator of benzoyl peroxide along with solvents such as methanol, 2-ethylhexanol and ethylen glycol monomethylether.

Step (5)

The polymer is then neutralized with an amine and held for about 35–55 minutes and then diluted with water to form a dispersion.

To form the aqueous dispersion, the acrylic polymer is at least partially neutralized with an amine and then dispersed in water. Typical amines that can be used are primary amines, secondary amines, tertiary amines, polyamines and hydroxyamines, such as ethanolamine, diethanolamine, triethanolamine, n-methylethanol amine, N,N-diethylethanolamine, N-aminoethanolamine, N-methyldiethanolamine, monoisopropanolamine, diisopropanolamine, triisopropanolamine, hydroxyamine, butanolamine, hexanolamine, methyl diethanolamine, N,N-diethylaminoethylamine, ethylene diamine, diethylene triamine, diethylene tetramine, hexamethylene tetramine, triethylamine and the like. The acrylic polymer is usually 50–60% neutralized and can be 100% neutralized. Neutralization of 50–60% is preferred since this degree of neutralization forms an aqueous dispersion which permits enamel formulation at high solids. The pH of the resulting aqueous coating composition is generally adjusted to a pH of 6–9, preferably 7.1–7.5.

The novel coating composition of this invention contains 10–40% by weight, based on the weight of the film-forming constituents, of a water dispersible or water soluble cross-linking resin. Preferably, alkylated melamine formaldehyde resins are used in an amount of about 20–40% by weight of this resin. The alkylated melamine formaldehyde resins can be partially or fully alkylated and have 1–4 carbon atoms in the alkyl group and are prepared by conventional techniques in which an alkanol such as methanol, ethanol, propanol, isopropanol or butanol is reacted with melamine fomaldehyde resin. Partially methylated melamine formaldehyde resins having 2–5 methylated groups and a molecular weight of 200–500 can be used. One preferred resin is hexakis(methoxymethyl) melamine. Melamine formaldehyde resins partially alkylated with isopropanol or butanol are other useful resins. Urea formaldehyde resins can also be used a cross-linking resin.

Generally the novel coating composition of this invention contains pigments in amounts of 0.1–40% by weight. A wide variety of pigments can be used such as metallic oxides, for example, titanium dioxide, iron oxide, zinc oxide, and the like, metal hydroxides, metal flakes, such as aluminum flake, metal powders, chromates, sulfates, carbonates, carbon black, silica, talc, phthalocyanine blues and greens, indolinone pigments and other organic pigments and dyes.

The novel coating composition of this invention can be applied to a variety of substrates such as glass, plastics, metal and the like, by any of the usual application methods such as spraying, electrostatic spraying, dipping, brushing, flow coating and the like. These coatings are baked according to conventional procedures. One preferred baking cycle comprises a prebake at about 75°–95° C. for about 5–30 minutes and then a bake at about 125°–200° C. to provide a high quality finish. The resulting finish is about 0.5–3.5 mils thick, preferably 1–2.5 mils in thickness, and can be rubbed or polished in accordance with conventional techniques to improve smoothness or gloss or both.

The novel coating composition of this invention is preferably applied over a primed metal substrate. Typical alkyd primers and epoxy primers pigmented with iron oxide, carbon black, titanium dioxide can be used. The primer can be applied by electrodeposition or can be applied by conventional spraying or dipping of the metal substrate. Also, the novel composition can be used directly over galvanized steel to form a durable coating.

The novel composition of this invention can be applied directly over a primed metal substrate without the use of an intermediate sealer coat. However, a sealer coat can be used to provide a finish with excellent adhesion and smoothness. These sealers may be water based or solvent based. One typically useful sealer composition is disclosed in Rohrbacher U.S. Pat. No. 3,509,086, issued Apr. 28, 1970.

The finish of the novel coating composition of this invention is characterized by a glossy and smooth appearance that has water spot resistance, excellent craze resistance, good durability and weatherability and gloss retention and has good gasoline resistance. These characteristics make the novel composition particularly attractive as an exterior finish for automobiles and trucks.

The following Examples illustrate the invention. The parts and percentages are by weight unless otherwise specified.

EXAMPLE 1

A coating composition is prepared by first forming the following acrylic polymer dispersion:

|  | Parts By Weight |
|---|---|
| Portion 1 |  |
| Methyl methacrylate monomer | 17.080 |
| Butyl acrylate monomer | 19.130 |
| 2-Ethyl hexyl acrylate monomer | 2.720 |
| Acrylic acid monomer | 1.150 |
| Isopropanol | 6.140 |
| Ethylene glycol monobutyl ether | 9.680 |
| Lauryl mercaptan | 0.294 |
| Portion 2 |  |
| Benzoyl peroxide | 0.672 |
| Methylethyl ketone | 1.580 |
| Ethylene glycol monomethyl ether acetate | 1.580 |
| Ethylene glycol monobutyl ether | 2.360 |
| Portion 3 |  |
| Methyl methacrylate monomer | 24.530 |
| Butyl acrylate monomer | 11.520 |
| 2-Hydroxyethyl acrylate monomer | 3.910 |
| Acrylic acid | 2.090 |
| Benzoyl peroxide | 0.906 |
| Isopropyl alcohol | 3.000 |
| Ethylene glycol monobutyl ether | 9.800 |
| Portion 4 |  |
| Methyl methacrylate monomer | 25.720 |
| Butyl acrylate monomer | 12.080 |
| 2-Hydroxyethyl acrylate monomer | 4.090 |
| Acrylic acid monomer | 2.200 |
| Benzoyl peroxide | 1.248 |
| Isopropanol | 4.120 |
| Ethylene glycol monobutyl ether | 13.150 |
| Portion 5 |  |
| Ethyl methacrylate monomer | 9.570 |
| Butyl acrylate monomer | 4.490 |
| 2-Hydroxyethyl acrylate monomer | 1.520 |
| Acrylic acid monomer | 0.820 |
| Benzoyl peroxide | 0.440 |
| Isopropanol | 1.460 |
| Ethylene glycol monobutyl ether | 4.760 |
| Portion 6 |  |
| Diethylethanolamine | 7.900 |
| Demineralized water | 101.300 |
| Portion 7 |  |
| Demineralized water | 169.090 |
| Total | 492.100 |

Portion 1 is charged into a reaction vessel equipped with a stirrer, a heating mantel, and a reflux condenser and then heated to the reflux temperature which is about 160° C. Portion 2 is premixed and then added and then Portion 3 is premixed and added at a uniform rate over a 20-minute period, while maintaining the reaction mixture at its reflux temperature. Portion 4 is premixed and added at a uniform rate over a 60-minute period while the reaction mixture is maintained at its reflux temperature. Portion 5 is premixed and added at a uniform rate over a 100-minute period, then the reaction mixture is maintained at its reflux temperature for an additional ½ hour. Portion 6 is premixed and then added to the reaction mixture and then Portion 7 is added to the reaction mixture and the reaction mixture is cooled to room temperature and filtered to remove any coagulum.

The resulting polymer dispersion has 34% polymer solids content in which the particle size is about 0.02–0.06 microns. The polymer has a relative viscosity of 1.16 measured at 25° C. in dimethyl formamide at about 0.5% polymer solids and has an acid number of about 33 to 35 and a carboxyl to hydroxyl ratio of 1 to 1.5. The polymer has the following composition: methyl methacrylate/butyl acrylate/2-hydroxyethyl acrylate/acrylic acid in a weight ratio of about 54.2/33.1/8.4/4.3 and uniformity factor of about 75–85%.

A phthalocyanine blue mill base is prepared as follows:

|  | Parts by Weight |
|---|---|
| Portion 1 |  |
| Hexakis(methoxymethyl) melamine | 546 |
| Isopropanol | 630 |
| Portion 2 |  |
| Phthalocyanine blue pigment | 210 |
| Portion 3 |  |
| Hexakis(methoxymethyl) melamine | 285 |
| Isopropanol | 426 |
| Total | 2097 |

Portion 1 was mixed with Portion 2 over a 30 minute period and then Portion 3 is added and the constituents are mixed for 30 minutes. The resulting composition is passed through a standard sand mill and ground two passes to provide a uniform mill base.

A blue mill base is prepared as follows:

|  | Parts By Weight |
|---|---|
| Portion 1 |  |
| Hexakis(methoxymethyl) melamine | 78 |
| Isopropanol | 90 |
| Portion 2 |  |
| "Monastral" blue pigment | 30 |
| Portion 3 |  |
| Hexakis(methoxymethyl) melamine | 41 |
| Isopropanol | 61 |
| Total | 300 |

Portion 1 is mixed with Portion 2 over a 30-minute period and then Portion 3 is added and the constituents are mixed for 30 minutes. The resulting composition is passed through a standard sand-mill and ground for two passes to provide a uniform blue mill base.

A violet mill base is prepared as follows:

|  | Parts By Weight |
|---|---|
| Portion 1 |  |
| Hexakis(methoxymethyl) melamine | 13.6 |
| Isopropanol | 45.1 |
| Portion 2 |  |
| "Monastral" violet pigment | 7.0 |
| Portion 3 |  |
| Hexakis(methoxymethyl) melamine | 7.6 |
| Isopropanol | 26.7 |
| Total | 100.0 |

Portions 1 and 2 are blended together and then mixed for 30 minutes and then Portion 3 is added and the composition is mixed for an additional 15 minutes. The resulting composition is then ground two passes in a standard sand-grinding mill to form a uniform mill base.

A green-yellow mill base is formed as follows:

|  | Parts By Weight |
|---|---|
| Portion 1 | |
| Hexakis(methoxymethyl) melamine | 78 |
| Isopropanol | 90 |
| Portion 2 | |
| Phthalocyanine green-yellow pigment | 30 |
| Portion 3 | |
| Hexakis(methoxymethyl) melamine | 41 |
| Isopropanol | 61 |
| Total | 300 |

Portion 1 is blended with Portion 2 in a mixing vessel for 30 minutes and then Portion 3 is added and blended to an additional 15 minutes. The resulting composition is then ground two passes in a standard sand-grinding mill to form a unifom mill base.

An aluminum flake mill base is prepared as follows:

|  | Parts By Weight |
|---|---|
| Aluminum flake | 1.71 |
| Hexakis(methoxymethyl) melamine | 5.75 |
| Isopropanol | 11.05 |
| Total | 18.51 |

The above constituents are thoroughly blended together for 30 minutes to form a uniform dispersion.

A paint composition is prepared by blending together the following ingredients:

|  | Parts By Weight |
|---|---|
| Portion 1 | |
| Phthalocyanine Blue mill base (prepared above) | 6.35 |
| Blue mill base (prepared above) | 0.20 |
| Violet mill base (prepared above) | 0.70 |
| Green-yellow mill base (prepared above) | 0.45 |
| Aluminum flake mill base (Prepared above) | 11.05 |
| Portion 2 | |
| Hexakis(methoxymethyl) melamine | 20.40 |
| Portion 3 | |
| Acrylic polymer dispersion (prepared above) | 272.40 |
| Portion 4 | |
| Deionized water | 18.00 |
| Portion 5 | |
| Butyl acrylate/acrylic acid copolymer solution - (80% polymer solids in alcohol of an 85/15 butyl acrylate/acrylic acid copolymer) | 3.30 |
| Silicone anti-cratering agent solution (10% low molecular weight silicone resin in water) | 3.35 |
| Deionized water | 31.00 |
| Total | 367.10 |

Portion 1 is charged in a mixing vessel and thoroughly blended together and then Portion 2 is added then blended with Portion 1 and Portions 3, 4 and 5 are added consecutively with blending after each addition. The resulting composition has a 30 second viscosity using a No. 2 Fisher cup and a total solids content of 28.1%.

A standard suction gun is used to apply the paint composition at an air pressure of about 80 pounds. The composition is applied to a steel panel primed with 1.5 mil thick iron oxide pigmented alkyd resin primer. Six passes are used to apply the paint applied and the panel is prebaked for 15 minutes at 90° C. and then baked for 30 minutes at 150° C.

The resulting film is about 2 mils thick and has good gloss, excellent hardness, excellent appearance, and is resistant to blistering at high humidity, has excellent resistance to water spotting good chip resistance, good gasoline resistance and excellent resistance toward deterioration by weathering.

EXAMPLE 2

A coating composition is prepared first by forming the following acrylic polymer dispersion:

|  | Parts By Weight |
|---|---|
| Portion 1 | |
| Methyl methacrylate monomer | 58.0 |
| Butyl acrylate monomer | 98.0 |
| 2-Hydroxyethyl acrylate monomer | 9.0 |
| Acrylic acid monomer | 8.0 |
| Isopropanol | 30.0 |
| Ethylene glycol monobutyl ether | 75.0 |
| Dodecyl mercaptan | 4.3 |
| Portion 2 | |
| Methyl methacrylate monomer | 27.0 |
| Benzoyl peroxide | 3.3 |
| Portion 3 | |
| Methyl methacrylate monomer | 293.0 |
| Butyl acrylate monomer | 142.0 |
| 2-Hydroxyethyl acrylate monomer | 31.0 |
| Acrylic acid monomer | 35.0 |
| Isopropanol | 42.0 |
| Ethylene glycol monobutyl ether acetate | 137.0 |
| Benzoyl peroxide | 17.0 |
| Total | 1009.6 |

Portion 1 is charged into a reaction vessel equipped with a stirrer, a heating mantel, and a reflux condenser and then the constituents are heated to a reflux temperature. Portion 2 is premixed and then added to the reaction vessel and then the reaction mixture is brought to its reflux temperature. Portion 3 is then premixed and 40% of Portion 3 is added over a 20-minute period while maintaining the reaction mixture at its reflux temperature. The remaining 60% of Portion 3 is added continuously over an 80-minute period and then the reaction mixture is held at its reflux temperature for an additional hour and then cooled to room temperature and filtered.

The resulting polymer dispersion has a solids content of about 70% and the polymer has a relative viscosity of about 1.09 measured at 25° in dimethyl formamide and about 0.5% polymer solids and the polymer has an acid number of about 47 and a carboxy to hydroxyl ratio of 1 to 0.58. The polymer has the following composition: methyl methacrylate/butyl acrylate/2-hydroxyethyl acrylate/acrylic acid in a weight ratio of about 54/34.2/5.7/6.1 and a uniformity factor of about 75–85%.

A coating composition is then prepared as follows:

|  | Parts By Weight |
|---|---|
| Portion 1 | |
| Polymer dispersion (prepared above) | 200 |

-continued

| | Parts By Weight |
|---|---|
| Portion 2 | |
| Diethylaminoethanolamine | 14 |
| Portion 3 | |
| Deionized water | 318 |
| Portion 4 | |
| Hexakis(methoxymethyl) melamine | 60 |
| Total | 592 |

Portion 1 is charged into a mixing vessel and then Portion 2 is added and blended with Portion 1. Portion 3 is then slowly added with constant agitation. After Portion 3 is added, all of Portion 4 is then added and mixed in. The resulting coating composition has a solids of content of about 33% and a spray viscosity of about 30 seconds using a No. 2 Parlin cup.

A standard spray gun is used to apply the coating composition to a steel panel primed with 1.5 mil thick iron oxide pigmented alkyd resin primer. After the coating is applied, the panel is baked for 15 minutes at 90° C. and then for 30 minutes at about 150° C. to provide a coating of about 2 mils thick that has a good appearance, good gloss, excellent hardness, and good chip resistance.

EXAMPLE 3

A coating composition is prepared by first forming the following acrylic polymer dispersion:

| | Parts By Weight |
|---|---|
| Portion 1 | |
| Methyl methacrylate monomer | 55.0 |
| Butyl acrylate monomer | 81.0 |
| 2-Hydroxyethyl acrylate monomer | 9.0 |
| Acrylic acid monomer | 15.0 |
| Isopropanol | 30.0 |
| Ethylene glycol monobutyl ether | 75.0 |
| Dodecyl mercaptan | 1.4 |
| Portion 2 | |
| Benzoyl peroxide | 3.3 |
| Methyl methacrylate monomer | 30.0 |
| Portion 3 | |
| Methyl methacrylate monomer | 292.0 |
| Butyl acrylate monomer | 116.0 |
| 2-Hydroxyethyl acrylate monomer | 33.0 |
| Acrylic acid monomer | 69.0 |
| Benzoyl peroxide | 13.0 |
| Isopropanol | 42.0 |
| Ethylene glycol monobutyl ether | 132.0 |
| Total | 996.7 |

Portion 1 is charged into a reaction vessel equipped with a stirrer, a heating mantel and a reflux condenser and then heated to its reflux temperature. Portion 2 is premixed and then added to the reaction mixture. Portion 3 is premixed and 46% of Portion 3 is continuously added over a 20-minute period, and then the remainder of Portion 3 is continuously added over a 60 minute period while maintaining the reaction mixture at its reflux temperature. The reflux of the reaction mixture is continued for an additional 90 minutes. The reaction mixture is then cooled to room temperature and filtered.

The resulting polymer dispersion has a solids content of about 71% and the polymer has a relative viscosity of 1.096 measured at 25° C. in dimethyl formamide at about 0.5% polymer solids, and the polymer has an acid number of about 93 to 94 and a carboxyl to hydroxyl ratio of 1 to 0.31. The polymer has the following composition: methyl methacrylate/butyl acrylate/hydroxyethyl acrylate/acrylic acid—53.8/28.2/6.0/12.0 and a uniformity factor of about 75–85%.

A coating composition is prepared by blending the following ingredients:

| | Parts By Weight |
|---|---|
| Portion 1 | |
| Polymer dispersion prepared above | 200 |
| Portion 2 | |
| Diethylaminoethanolamine | 15 |
| Portion 3 | |
| Deionized water | 318 |
| Portion 4 | |
| Hexakis(methoxymethyl) melamine | 60 |
| Total | 593 |

Portion 1 is charged into a mixing vessel and then Portion 2 is added with constant agitation and then Portion 3 is slowly added to the reaction mixture and after Portion 3 has been added, Portion 4 is added and blended with the reaction mixture. The resulting composition has a 33% polymer solids content and a spray viscosity of 30 seconds measured in a No. 2 Parlin cup. The composition is then sprayed onto a steel panel primed as in Example 1 and baked according to the procedures described in Example 1. The resulting finish is about 2 mils thick, has good appearance and is an acceptable finish for the exterior of automobile bodies and truck bodies.

EXAMPLE 4

A coating composition is prepared by first forming the following acrylic polymer dispersion:

| | Parts By Weight |
|---|---|
| Portion 1 | |
| Methyl methacrylate monomer | 18.210 |
| Butyl acrylate monomer | 21.050 |
| 2-Hydroxyethyl acrylate monomer | 1.900 |
| Acrylic acid monomer | 1.810 |
| Isopropanol | 6.550 |
| Ethylene glycol monobutyl ether | 8.730 |
| Lauryl mercaptan | 0.310 |
| Portion 2 | |
| Benzoyl peroxide | 0.716 |
| Ethylene glycol monobutyl ether | 5.880 |
| Methylethyl ketone | 1.600 |
| Portion 3 | |
| Methyl methacrylate monomer | 26.800 |
| Butyl acrylate monomer | 13.030 |
| 2-Hydroxyethyl acrylate monomer | 2.860 |
| Acrylic acid monomer | 3.180 |
| Benzoyl peroxide | 1.150 |
| Isopropanol | 3.800 |
| Ethylene glycol monobutyl ether | 12.400 |
| Portion 4 | |
| Methyl methacrylate monomer | 26.800 |
| Butyl acrylate monomer | 13.030 |
| 2-Hydroxyethyl acrylate monomer | 2.850 |
| Acrylic acid monomer | 3.170 |
| Benzoyl peroxide | 1.150 |
| Isopropanol | 3.800 |
| Ethylene glycol monobutyl ether | 12.400 |
| Portion 5 | |
| Methyl methacrylate monomer | 10.210 |
| Butyl acrylate monomer | 4.880 |
| 2-Hydroxyethyl acrylate monomer | 1.160 |

|  | Parts By Weight |
|---|---|
| Acrylic acid monomer | 1.200 |
| Benzoyl peroxide | 0.474 |
| Isopropanol | 1.550 |
| Ethylene glycol monobutyl ether | 5.080 |
| Portion 6 | |
| Diethylethanolamine | 10.500 |
| Demineralized water | 128.000 |
| Portion 7 | |
| Demineralized water | 209.60 |
| Total | 566.730 |

Portion 1 is charged into a reaction vessel equipped with a stirrer, a heating mantel and a reflux condenser and the ingredients are heated to the reflux temperature. Portion 2 is premixed and then added to the reaction mixture and then Portion 3 is added at a uniform rate over a 20 minute period while maintaining the reaction mixture at a reflux temperature. Portion 4 is premixed and then about 34% of Portion 4 is added at a continuous rate to the reaction mixture over a 20-minute period. Then the remainder of Portion 4 is added at a continuous rate over the next 60-minute period while maintaining the reaction mixture at its reflux temperature. Portion 5 is premixed and then added at a uniform rate over a 100-minute period keeping the reaction mixture at its reflux temperature and then the reaction mixture is held at its reflux temperature for an additional ½ hour. Portion 6 is then added to the reaction mixture and then Portion 7 is added and the mixture is cooled and filtered to remove coagulum.

The resulting polymer dispersion has a polymer solids content of about 26% by weight and the polymer has a relative viscosity of about 1.15 measured at 25° C. in dimethyl formamide solvent at about 0.5% polymer solids. The polymer has an acid number of about 46 to 47 and a carboxyl to hydroxyl ratio of 1 to 0.62. The polymer has the following composition: methyl methacrylate/butyl acrylate/2-hydroxyethyl acrylate/acrylic acid in a weight ratio of about 54/34/6/6 and a uniformity factor of about 75–85%.

A paint composition is then prepared by blending together the following ingredients:

|  | Parts By Weight |
|---|---|
| Portion 1 | |
| Mill base (described in Example 1) | 6.35 |
| "Monastral" Blue mill base (prepared in Example 1) | 0.20 |
| "Monastral" Violet mill base (prepared in Example 1) | 0.70 |
| Phthalocyanine green-yellow mill base (prepared in Example 1) | 0.45 |
| Aluminum Flake mill base (prepared in Example 1) | 11.05 |
| Portion 2 | |
| Hexakis(methoxymethyl) melamine | 20.40 |
| Portion 3 | |
| Acrylic polymer dispersion (prepared above) | 272.40 |
| Portion 4 | |
| Deionized water | 18.00 |
| Portion 5 | |
| Butyl acrylate/acrylic acid copolymer solution (described in Example 1) | 3.30 |
| Anti-cratering solution (10% silicone solution) | 3.35 |
| Deionized water | 31.00 |

|  | Parts By Weight |
|---|---|
| Total | 367.20 |

Portion 1 is charged into a mixing vessel and thoroughly blended together and then Portion 2 is added and blended and then Portion 3 is added and the constituents are thoroughly blended together. Portion 4 is added and blended with the mixture and then Portion 5 is added and thoroughly blended with the mixture. The resulting paint composition has a 28% solids content and a spray viscosity of 31 seconds using a No. 2 Zahn Cup.

The paint is sprayed onto a steel panel primed with 1.5 mil thick iron oxide pigment alkyd resin primer as in Example 1. The coating is baked as in Example 2 providing a film about 2 mils thick which has good gloss, good appearance, good adhesion to the substrate, good chip resistance, good gasoline resistance and resistance to deterioration by weathering.

EXAMPLE 5

A coating composition is prepared by first forming the following acrylic polymer dispersion:

|  | Parts By Weight |
|---|---|
| Portion 1 | |
| Methyl methacrylate monomer | 47 |
| Styrene monomer | 30 |
| Butyl Acrylate monomer | 112 |
| 2-Hydroxyethyl acrylate monomer | 15 |
| Acrylic acid monomer | 6 |
| Ethylene glycol monobutyl ether | 190 |
| Isopropanol | 30 |
| Dodecyl mercaptan | 2 |
| Portion 2 | |
| Ethylene glycol monobutyl ether | 30 |
| Tertiary butyl peracetate solution (75% solution in mineral spirits) | 9.5 |
| Portion 3 | |
| Methyl methacrylate monomer | 117 |
| Styrene monomer | 174 |
| Butyl acrylate monomer | 112 |
| 2-Hydroxyethyl acrylate monomer | 42 |
| Acrylic acid monomer | 23 |
| Portion 4 | |
| Isopropanol | 40 |
| Tertiarybutyl peracetate solution (described above) | 3.9 |
| Total | 983.4 |

Portion 1 is charged into a reaction vessel equipped with a stirrer, a heating mantel and a reflux condenser and heated to its reflux temperature. Portion 2 is then added and the reaction mixture is held at its reflux temperature for 5 minutes. Portions 3 and 4 are premixed and added simultaneously in the following order: 85% of portion 3 is slowly added over a 25 minute period along with 75% of portion 4 then the remainder of portion 3 is added over a 60 minute period while the remainder of portion 4 is added over a 90 minute period. During these additions, the reaction mixture is held at its reflux temperature and after the additions the reaction mixture is refluxed for one hour.

The resulting polymer dispersion has a solids content of 70%, the polymer has a relative viscosity measured at 25° C. in dimethyl formamide at 0.5% polymer solids of 1.15; the polymer has an acid number of 33-35 and a carboxyl to hydroxyl ratio of 1 to 1.5. The polymer has the following composition: styrene/methyl methacrylate/butyl acrylate/2-hydroxyethyl acrylate/acrylic acid—30.0/24.2/33.1/8.4/4.3 and has a uniformity factor of about 75-85%.

A coating composition is prepared as in Example 3 except the above prepared polymer dispersion is used. The composition is sprayed onto a primed steel panel and baked as in Example 3. The resulting finish is about 2 mils thick, has a good appearance and is an acceptable finish for the exterior of automobile and truck bodies.

EXAMPLE 6

A coating composition is prepared by first forming the following polymer dispersion by a programmed polymerization process:

|  | Parts By Weight |
|---|---|
| Portion 1 | |
| Methyl methacrylate monomer | 241 |
| Butyl methacrylate monomer | 571 |
| 2-Hydroxy ethyl acrylate monomer | 55 |
| Acrylic acid monomer | 46 |
| Isopropanol | 402 |
| Ethylene glycol monobutyl ether | 771 |
| Lauryl mercaptan | 14 |
| Portion 2 | |
| Benzoyl peroxide | 7 |
| Methyl methacrylate monomer | 254 |
| Portion 3 | |
| Methyl methacrylate monomer | 1211 |
| Butyl acrylate monomer | 504 |
| 2-Hydroxy ethyl acrylate monomer | 135 |
| Acrylic acid monomer | 144 |
| Benzoyl peroxide | 72 |
| Portion 4 | |
| N,N-diethyl aminoethyl amine | 185 |
| Water | 310 |
| Portion 5 | |
| Water | 1600 |
| Portion 6 | |
| Water | 1600 |
| Portion 7 | |
| Water | 1878 |
| Total | 10,000 |

Portion 1 is premixed and charged into a reaction vessel equipped with a stirrer, a heating mantel and a reflux condenser and heated to its reflux temperature. Portion 2 is then added. Portion 3 is premixed and 30% added over a 15 minute period while maintaining a reflux temperature, 45% of Portion 3 is then added over a 50 minute period while maintaining a reflux temperature and the remainder of Portion 3 is added over the next 80 minutes while maintaining a reflux temperature and the reaction mixture is held at its reflux temperature for another 30 minutes. Portion 4 is added and mixed for 10 minutes then Portion 5 is added over a 10 minute period with mixing. Portions 6 and 7 are then added with mixing between each addition.

The resulting polymer dispersion has a solids content of 32%. About 40% of the polymer is dispersed and the dispersed polymer particles have a particle size of about 0.02-0.06 microns and the remaining 60% of the polymer is dissolved. The polymer has a relative viscosity of 1.15-1.16 measured as in Example 1, the polymer has an acid number of 47 and a carboxyl to hydroxyl ratio of 1 to 0.62. The polymer has the following composition: methyl methacrylate/butyl acrylate/2-hydroxyethyl acrylate/acrylic acid—54/34/6/6, and has a uniformity factor at about 75-85%.

A coating composition is prepared as in Example 4 except the above prepared polymer dispersion is used. The composition is sprayed onto a primed steel panel and baked as in Example 4. The resulting finish is about 2 mils thick, and has a good appearance and is an acceptable finish for the exterior of automobile and truck bodies.

EXAMPLE 7

A coating composition is prepared by first forming the following acrylic polymer dispersion by a programmed polymerization process:

|  | Parts By Weight |
|---|---|
| Portion 1 | |
| Methyl methacrylate monomer | 35.704 |
| Butyl acrylate monomer | 42.907 |
| 2-Hydroxyethyl acrylate monomer | 5.316 |
| Acrylic Acid monomer | 4.412 |
| Methanol | 9.829 |
| Ethylene glycol monomethylether | 28.914 |
| 2-Ethylhexanol | 44.220 |
| Portion 2 | |
| Mercaptoethanol | .762 |
| 2-Ethylhexanol | 2.010 |
| Portion 3 | |
| Methylmethacrylate monomer | 24.572 |
| Benzoyl peroxide | .653 |
| Portion 4 | |
| 2-Ethylhexanol | 2.010 |
| Portion 5 | |
| Methyl methacrylate monomer | 100.463 |
| Butyl acrylate monomer | 23.896 |
| 2-Hydroxyethyl acrylate monomer | 9.759 |
| Acrylic acid monomer | 10.442 |
| Benzoyl peroxide | 6.100 |
| Portion 6 | |
| Mercaptoethanol | 1.145 |
| 2-Ethylhexanol | 4.700 |
| Portion 7 | |
| Methanol | 4.700 |
| Ethylene glycol monomethylether | 4.700 |
| 2-Ethylhexanol | 4.700 |
| Methyl methacrylate monomer | 33.491 |
| Butyl acrylate monomer | 7.966 |
| 2-Ethylhexyl acrylate monomer | 3.256 |
| Acrylic acid monomer | 3.477 |
| Benzoyl peroxide | 2.030 |
| Portion 8 | |
| Diethylethanolamine | 17.909 |
| Portion 9 | |
| Deionized water | 439.095 |
| Total | 879.138 |

Portion 1 is premixed in a vessel and charged into a reaction vessel equipped with a stirrer, a heating mantel and a reflux condenser and heated to its reflux temperature. Portion 2 is premixed and then added rapidly to the reaction mixture. Portion 3 is premixed and added rapidly to the reaction mixture. Portion 4 is used to rinse the premix vessel and then added to the reaction mixture. Portion 5 is premixed and 40% of Portion 5 is added at a uniform rate to the reaction mixture, held at reflux, over a 15 minute period and then 60% of Portion 5 is added at a uniform rate to the reaction mixture over a 50 minute period. Portion 6 is premixed and added simultaneously with Portion 5. Portion 7 is premixed and added over an 80 minute period to the reaction mixture which is held at reflux. The reaction mixture is then maintained at its reflux temperature for an additional 30 minutes. Portion 8 is then added over a 5 minute period and the reaction mixture is allowed to cool for 45 minutes. Portion 9 is added over a 40 minute period and held for an additional 15 minutes.

The resulting polymer dispersion has a polymer solids content of about 35%; the polymer has a relative viscosity measured at 25° C. in dimethyl formamide at 0.5% polymer solids of 1.220–1.245; the polymer has an acid number of 47 and a carboxyl to hydroxyl ratio of 1:0.62. The polymer has the following composition: methylmethacrylate/butylacrylate/2-hydroxyethyl acrylate/acrylic acid in a weight ratio of 64/24/6/6, a uniformity factor of about 75% to 85% and a calculated glass transition temperature of about 40° C.

An aluminum flake mill base is prepared as follows:

| | Parts By Weight |
|---|---|
| Acrylic polymer dispersion (prepared above) | 145.0 |
| Diethylaminoethanol | 2.9 |
| Deionized water | 34.6 |
| Aluminum flake paste (60% solids aluminum flake in mineral spirits) | 83.0 |
| Total | 265.5 |

The above constituents are thoroughly blended together for 30 minutes to prepare a uniform dispersion.

A violet mill base is prepared as follows:

| | Parts By Weight |
|---|---|
| Indigo violet toner | 41.19 |
| Aqueous polymeric dispersant composition (70% solids of a polymer of methyl methacrylate/butyl acrylate/acrylic acid in a weight ratio of 50/30/20) | 58.81 |
| Total | 100.00 |

The above constituents are mixed together and placed on a heated 2 roll mill and milled for 30 minutes while maintaining a roll temperature of about 40° C. giving a pigment chip. The chip then is dissolved as follows:

| | Parts By Weight |
|---|---|
| Violet chip (prepared above) | 32.0 |
| Diethylethanolamine | 5.1 |
| Deionized water | 62.9 |
| Total | 100.0 |

The above ingredients are charged into a ball mill and ground for about 9 hours to form the mill base.

A blue mill base is prepared as follows:

| | Parts By Weight |
|---|---|
| Portion 1 | |
| "Monastral" Blue pigment (phthalocyanine blue pigment) | 29.00 |
| Deionized water | 38.74 |
| Aqueous polymeric dispersant composition (50% solids of a polymer of methyl methacrylate/butyl acrylate/acrylic acid in a weight ratio of 50/30/20 neutralized 100% with diethylethanolamine) | 17.26 |
| Portion 2 | |
| Deionized water | 15.00 |
| Total | 100.00 |

Portion 1 is charged into a ball mill and ground for 50,000 cycles than Portion 2 is added and the composition is mixed for 30 minutes to form the mill base.

A coating composition is prepared as follows:

| | Parts By Weight |
|---|---|
| Acrylic polymer dispersion (prepared above) | 352.1 |
| Diethylethanolamine | 3.2 |
| Deionized water | 70.7 |
| Aqueous silicone solution (10% solids of glycol polysiloxane fluid) | 0.9 |
| Melamine Resin solution (93% solids in isopropanol of hexakis(methoxymethyl)melamine) | 57.1 |
| Blue mill base (prepared above) | 0.8 |
| Violet mill base (prepared above) | 0.1 |
| Aluminum mill base (prepared above) | 15.2 |
| Total | 500.1 |

The above constituents are thoroughly blended together to form a coating composition. The composition then is reduced with water to spray viscosity of 30 seconds determined with a No. 2 Fisher Cup. A standard spray gun as described in Example 1 is used to apply the coating composition to a steel panel primed with a 1.5 mil thick iron oxide pigmented alkyd resin primer. The panel is baked using the same procedure as in Example 1.

The resulting paint film is about 2 mils thick and has good gloss, excellent hardness, an excellent appearance and is resistant to blistering at high humidities, has excellent water spot resistance, good resistance to chipping, good gasoline resistance and excellent resistance to weathering.

The invention claimed is:

1. An aqueous thermosetting acrylic enamel coating composition free of external surfactants which comprises 10–60% by weight of film-forming constituents and correspondingly 90–40% by weight of water and up to 20% by weight of a solvent for the film-forming constituents; wherein the film-forming constituents consist essentially of
   (1) 60–90% by weight, based on the weight of the film-forming constituents, of an acrylic polymer having a uniformity factor of 80–95% and consists essentially of polymerized monomers of about
      (a) 50–60% by weight, based on the weight of the acrylic polymer, of methyl methacrylate,
      (b) 30–40% by weight, based on the weight of the acrylic polymer, of butyl acrylate;
      (c) 5–10% by weight, based on the weight of the acrylic polymer, of hydroxyethyl acrylate;
      (d) 4–12% by weight, based on the weight of the acrylic polymer, of acrylic acid or methacrylic acid;
   wherein 30–50% by weight of the acrylic polymer is dispersed and has a particle size of 0.01–0.10 microns and the remaining 50–70% is soluble and dissolved and the polymer has a carboxyl to hydroxyl ratio of 1:0.3 to 1:1.5, an acid number of about 35–80 and a weight average molecular weight of 10,000–50,000, and (2) 10–40% by weight, based on the weight of the film-forming constituent, of a hexa kis (methoxymethyl) melamine; and the composition contains sufficient amine to provide a pH of about 6–9.

2. The coating composition of claim 1 containing 0.1–40% by weight pigment and having a polymer solids content of about 20–50% by weight.

3. The coating composition of claim 2 in which the acrylic polymer consists essentially of 28–32% by weight of styrene, 22–26% by weight of methyl methacrylate, 30–35% by weight of butyl acrylate, 7–9% by weight of hydroxy ethyl acrylate, 4–6% by weight of acrylic acid, and has an acid number of 30–50, and a carboxyl to hydroxyl ratio of 1:0.4 to 1:1.5.

4. The coating composition of claim 2 in which the acrylic polymer consists essentially of 54% methyl methacrylate 34% butyl acrylate, 6% 2-hydroxyethyl acrylate and 6% acrylic acid and has an acid number of about 45–50 and a carboxyl to hydroxyl ratio of about 1:0.6.

5. An aqueous thermosetting acrylic enamel coating composition free of external surfactants which comprises 10–60% by weight of film-forming constituents and correspondingly 90–40% by weight of water and up to 20% by weight of a solvent form the film-forming constituents; wherein the film-forming constituents consist essentially of (1) 60–90% by weight, based on the weight of the film-forming constituents, of an acrylic polymer prepared by solution polymerization having a uniformity factor of at least 75% and consists essentially of polymerized monomers of about (a) 55–76% by weight, based on the weight of the acrylic polymer, of methyl methacrylate;

(b) 18–38% by weight, based on the weight of the acrylic polymer, of butylacrylate;

(c) 4–15% by weight, based on the weight of the acrylic polymer, of hydroxy ethyl acrylate;

(d) 2–12% by weight, based on the weight of the acrylic polymer, of acrylic acid;

wherein the polymer has a carboxyl to hydroxyl ratio of 1:0.2 to 1:4, an acid number of about 35–150, a weight average molecular weight of 10,000–50,000; and a glass transition temperature of 20° to 50° C. and about 30 to 50% by weight of the acrylic polymer is dispersed in the composition and the dispersed polymer particles have a particle size of about 0.01–0.10 microns and the remaining 50–70% of the polymer is soluble and is dissolved in the composition (2) 10–40% by weight, based on the weight of the film-forming constituent of hexa kis (methoxymethyl) melamine and the composition contains sufficient tertiary amine to provide a pH of about 6–9.

6. The coating composition of claim 5 containing 0.1–40% by weight pigment and having a polymer solids content of about 20–50% by weight.

7. The coating composition of claim 6 in which the acrylic polymer consists essentially of 60–70% by weight of methyl methacrylate, 14–32% by weight of butyl acrylate, 4–8% by weight of hydroxy ethyl acrylate and 4–8% by weight of acrylic acid.

8. The coating composition of claim 6 in which the acrylic polymer consists essentially of 62–66% by weight of methyl methacrylate, 22–26% by weight of butyl acrylate, 5–7% by weight of hydroxy ethyl acrylate, 5–7% by weight of acrylic acid.

* * * * *